(12) United States Patent
Wittrock et al.

(10) Patent No.: US 7,638,452 B2
(45) Date of Patent: Dec. 29, 2009

(54) METHOD FOR THE REACTIVATION OF THERMALLY AGED NITROGEN OXIDE STORAGE CATALYTIC CONVERTERS

(75) Inventors: Meike Wittrock, Biebergemuend (DE); Ulrich Goebel, Hattersheim (DE); Thomas Kreuzer, Karben (DE); Christina Maria Casapu, Waldshut-Tieningen (DE); Jan-Dierk Grunwaldt, Zurich (CH); Marek Maciejewski, Zurich (CH); Alfons Baiker, Opfikon (CH)

(73) Assignee: Umicore AG & Co. KG, Hanau (DE)

( * ) Notice: Subject to any disclaimer, the term of this patent is extended or adjusted under 35 U.S.C. 154(b) by 0 days.

(21) Appl. No.: 11/995,590

(22) PCT Filed: Jul. 15, 2006

(86) PCT No.: PCT/EP2006/006941

§ 371 (c)(1), (2), (4) Date: Jun. 26, 2008

(87) PCT Pub. No.: WO2007/009679

PCT Pub. Date: Jan. 25, 2007

(65) Prior Publication Data

US 2009/0131243 A1 May 21, 2009

(30) Foreign Application Priority Data

Jul. 22, 2005 (DE) .................. 10 2005 034 344

(51) Int. Cl.
B01J 38/06 (2006.01)
B01J 8/02 (2006.01)
(52) U.S. Cl. .................. 502/55; 502/56; 423/213.2
(58) Field of Classification Search .............. 502/55–56
See application file for complete search history.

(56) References Cited

U.S. PATENT DOCUMENTS 4,423,019 A * 12/1983 Bertolacini et al. ..... 423/244.11
6,517,784 B1 * 2/2003 Iizuka et al. ................ 422/177

FOREIGN PATENT DOCUMENTS

| EP | 0 982 066 | 3/2000 |
|---|---|---|
| EP | 1 386 656 A1 | 2/2004 |
| GB | 2 409 656 A | 7/2005 |

OTHER PUBLICATIONS

Casapu Maria et al.; "Formation and stability of barium aluminate and cerate in Nox . . . " Appl. Catal. B Environmental,; Applied Catalysts; Mar. 31, 2006; Seiten 232-242, XP002412079.

(Continued)

*Primary Examiner*—Stuart Hendrickson
*Assistant Examiner*—Richard M Rump
(74) *Attorney, Agent, or Firm*—Robert G. Weilacher; Smith, Gambrell & Russell

(57) ABSTRACT

Nitrogen oxide storage catalysts are used for removing the nitrogen oxides present in the lean-burn exhaust gas of lean-burn engines. Here, the purifying action is based on the nitrogen oxides being stored in the form of nitrates by the storage material of the storage catalyst during a lean-burn operating phase of the engine and the previously formed nitrates being decomposed in a subsequent rich-burn operating phase of the engine and the nitrogen oxides which are being liberated again being reacted with the reducing exhaust gas constituents over the storage catalyst to form nitrogen, carbon dioxide and water. Storage catalysts are thermally aged by high temperatures. The aging is due to sintering of the catalytically active noble metal components of the catalyst and to formation of compounds of the storage components with the support materials. According to the invention, the formation of compounds of the storage materials can be largely reversed by treatment of the storage material with a gas mixture comprising nitrogen dioxide and/or carbon dioxide and water vapor at temperatures of from 300 to 500° C. The reactivation can be carried out either directly on the vehicle by setting appropriate exhaust gas conditions or during a routine service by removal of the catalyst from the vehicle and treatment with a gas mixture in an appropriate apparatus.

8 Claims, 3 Drawing Sheets

OTHER PUBLICATIONS

Figure 1:
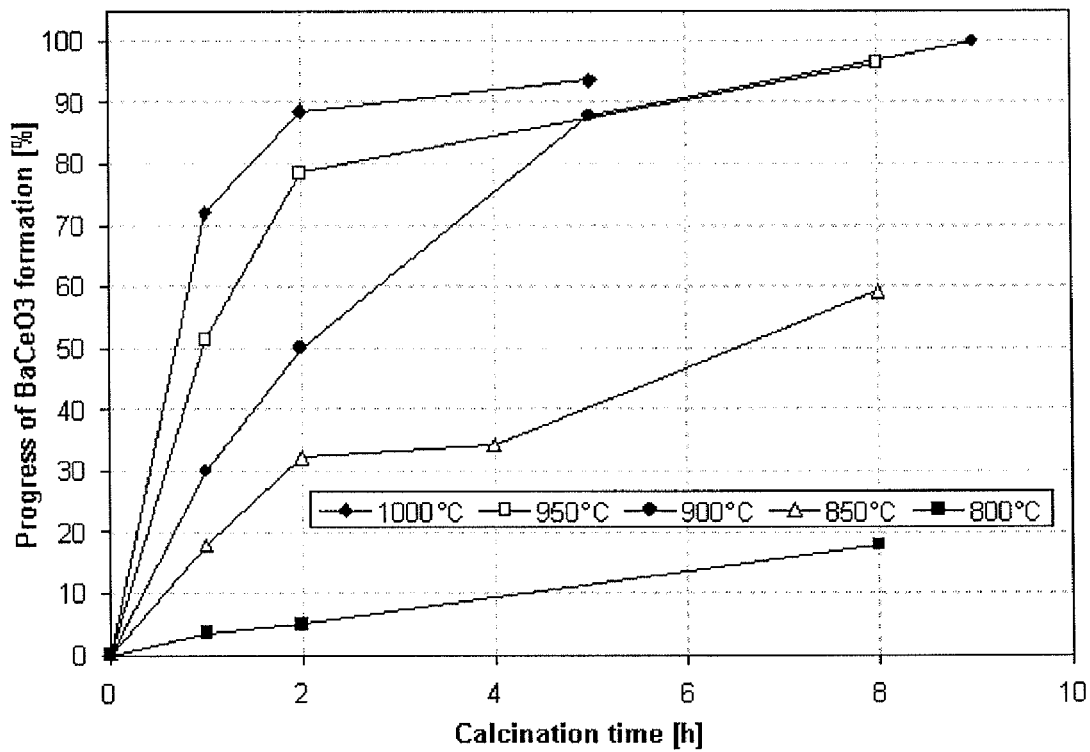

Casapu Maria et al.; "Formation and stability of barium aluminate and cerate in Nox . . . " Appl. Catal. B Environ.; Applied Catalysts; Mar. 31, 2006; Seiten 232-242, XP002412079.

English Translation of the International Preliminary Report on Patentability.

* cited by examiner

METHOD FOR THE REACTIVATION OF THERMALLY AGED NITROGEN OXIDE STORAGE CATALYTIC CONVERTERS

The invention relates to a method of reactivating thermally aged nitrogen oxide storage catalysts comprising nitrogen oxide storage compounds supported on a cerium oxide containing support material.

Nitrogen oxide storage catalysts are used for removing the nitrogen oxides present in the lean-burn exhaust gas of lean-burn engines. Here, the purifying effect is based on the nitrogen oxides being stored in the form of nitrates by the storage material of the storage catalyst during a lean operating mode of the engine and the previously formed nitrates being decomposed in a subsequent rich operating mode of the engine and the desorbed nitrogen oxides being reacted with the reducing exhaust gas constituents over the storage catalyst to form nitrogen, carbon dioxide and water. For the purposes of the present invention, lean-burn engines include both diesel engines and gasoline engines which are operated using a lean air/fuel mix during the predominant part of the period of operation. The nitrogen oxides present in the exhaust gas of these engines consist predominantly of nitrogen monoxide.

The way in which nitrogen oxide storage catalysts work is described in detail in the SAE document SAE 950809. According to this, nitrogen oxide storage catalysts comprise a catalyst material which is usually applied in the form of a coating to an inert honeycomb body composed of ceramic or metal, known as a support body. The catalyst material comprises a nitrogen oxide storage material and a catalytically active component. The nitrogen oxide storage material in turn comprises the actual nitrogen oxide storage component which is deposited on a support material in highly disperse form.

As storage components, predominantly the basic oxides of the alkali metals, the alkaline earth metals and the rare earth metals, but in particular strontium oxide and barium oxide are used, which form the corresponding nitrates with nitrogen dioxide. It is known that in air these materials are predominantly present in the form of carbonates and hydroxides. These compounds are likewise suitable for storing the nitrogen oxides. For this reason, if reference is made to basic storage oxides in the context of the invention, this also includes the corresponding carbonates and hydroxides.

Suitable support materials for the storage components are thermally stable metal oxides which have a high surface area of more than 10 $m^2/g$ and make highly disperse deposition of the storage components possible. The present invention is concerned, in particular, with storage materials which comprise support materials based on cerium oxide. This includes doped cerium oxide and in particular the mixed oxides of cerium with zirconium.

As catalytically active components, use is made of the noble metals of the platinum group, which are generally deposited separately from the storage components on separate support materials. Active, high-surface-area aluminum oxide is predominantly used as support material for the platinum group metals.

The task of the catalytically active components is to convert carbon monoxide and hydrocarbons in the lean exhaust gas into carbon dioxide and water. In addition, they should oxidize the nitrogen monoxide present in the exhaust gas to nitrogen dioxide so that it can react with the basic storage material to form nitrates. As an increasing amount of nitrogen oxides is incorporated into the storage material, the storage capacity of the material decreases and the material therefore has to be regenerated from time to time. This is achieved by operating the engine with a rich air/fuel mixture for a short time. Under the reducing conditions in the rich exhaust gas, the nitrates formed are decomposed to form nitrogen oxides NOx and reduced using carbon monoxide, hydrogen and hydrocarbons as reducing agent to nitrogen with formation of water and carbon dioxide.

During operation, storage catalysts are sometimes subjected to high exhaust gas temperatures, which can lead to thermal damage to the catalysts. A distinction can be made between two significant aging effects:

The catalytically active noble metal components have been applied in highly disperse form having a mean particle size of from about 2 to 15 nm to the oxidic materials of the storage catalyst. Owing to the fine dispersion, the noble metal particles have a high surface area for interaction with the constituents of the exhaust gas. Particularly in the case of lean exhaust gas of lean-burn engines, an irreversible increase in the size of the noble metal crystallites, which is associated with an irreversible reduction in the catalytic activity, is observed as the exhaust gas temperature rises.

The storage components are likewise subject to sintering due to high temperatures, as a result of which their catalytically active surface area decreases. In addition, it has been observed that the storage components deposited on support materials form compounds with the support materials at high temperatures and these compounds have a lower storage capacity for nitrogen oxides (see SAE Technical Paper 970746 and EP 0982066 A1). If, for example, barium oxide is used as storage component on a support material comprising cerium oxide, there is a risk of formation of barium cerate ($BaCeO_3$).

The sintering of the noble metal particles is an irreversible process. Restoration of the original crystallite sizes by means of a specific treatment does not appear to be possible. On the other hand, there is the hope that the formation of compounds between storage components and support materials can be reversed again by means of a suitable treatment. The catalytic activity of a nitrogen oxide storage catalyst after thermal damage could in this way be at least partly restored.

It is therefore an object of the present invention to provide a method of reactivating nitrogen oxide storage catalysts whose storage capacity has been reduced by formation of compounds between the storage components and the support materials as a result of high temperatures.

This object is achieved by a method of reactivating a thermally aged nitrogen oxide storage catalyst comprising basic strontium or barium compounds or strontium and barium compounds on a support material comprising cerium oxide and additionally containing strontium and/or barium compounds with the support material formed as a result of thermal aging. The method is characterized in that the compounds of strontium and/or barium with the support material are decomposed by treatment with a gas mixture comprising nitrogen dioxide, water vapor and, if appropriate, carbon dioxide at temperatures in the range from 300 to 500° C.

The invention is based on studies on the formation of barium cerate ($BaCeO_3$) during the thermal aging of storage materials comprising basic compounds of barium on a support material comprising cerium oxide, and also on studies on the decomposition of the reaction product. The starting point for more detailed studies was the observation that the barium cerate formed partly decomposes again into barium oxide and cerium oxide when the material is impregnated with an aqueous solution of nitric acid. The barium oxide formed here as an intermediate immediately reacts further to form barium nitrate. The decomposition presumably proceeds according to the reaction equation (1):

$$BaCeO_3 + 2HNO_3(aq) \rightarrow Ba(NO_3)_2 + CeO_2 + H_2O \quad (1)$$

The decomposition proceeds relatively slowly at a temperature of 80° C.

Furthermore, it has been found that barium cerate is virtually completely decomposed on treatment with a gas mixture comprising nitrogen dioxide and water vapor at temperatures of from 300 to 500° C. and a sufficient reaction time. The highest reaction rates were observed at 400° C. In this case, the decomposition probably proceeds in two stages according to the reaction equations (2):

$$BaCeO_3 + H_2O(g) \rightarrow \left.\begin{array}{l} BaO + CeO_2 \\ \downarrow NO_2(g) \\ Ba(NO_3)_2 \end{array}\right\} \quad (2)$$

Furthermore, a decomposition of barium cerate on treatment with a gas mixture comprising carbon dioxide in the temperature range from 400 to 980° C. to form barium carbonate ($BaCO_3$) and cerium oxide could be observed. Above 980° C., barium cerate is formed again by reaction of barium oxide formed as an intermediate and cerium oxide.

The decomposition of barium cerate according to the invention and thus the reactivation of the storage material by treatment with a gas mixture comprising nitrogen dioxide, water vapor and, if appropriate, carbon dioxide can be used to reactivate nitrogen oxide storage catalysts which are part of an exhaust gas purification unit on a vehicle having a lean-burn engine and exhaust gas recirculation directly on the vehicle in the event of thermal damage to the storage catalyst. The reactivating gas mixture is then formed by the exhaust gas of the engine itself. The operating conditions of the engine have to be selected so that the exhaust gas contains a very high proportion of nitrogen oxides and enough heat to ensure a temperature in the range from 300 to 500° C. upstream of the nitrogen oxide storage catalyst.

The exhaust gas used for reactivation preferably comprises from 0.05 to 5% by volume of nitrogen dioxide, from 5 to 20% by volume of oxygen, from 5 to 15% by volume of water vapor, from 0 to 20% by volume of carbon dioxide and essentially nitrogen as balance. The treatment time for complete decomposition of barium cerate is, depending on the exhaust gas composition and temperature, from 0.5 to 5 hours.

Vehicles having a lean-burn engine are typically equipped with exhaust gas recirculation. In this case, the nitrogen oxide content of the exhaust gas can be increased significantly by switching off the exhaust gas recirculation. As a further measure for increasing the nitrogen dioxide content of the exhaust gas, the timing of the ignition of the engine can be altered so that the temperature in the combustion chamber increases. Of course, these two measures, which can be carried out independently of one another, can also be combined in order to obtain higher nitrogen dioxide contents in the exhaust gas. The reactivation can also be employed in the case of exhaust gas purification units which contain two exhaust gas purification converters, namely a catalytic converter close to the engine and an underfloor converter. Here, both converters can contain nitrogen oxide storage catalysts. As an alternative, the converter close to the engine can have a diesel oxidation catalyst or a three-way catalyst and the underfloor converter can have a nitrogen oxide storage catalyst. In the case of a diesel oxidation catalyst in the converter close to the engine, this leads to an increase in the nitrogen dioxide concentration of the exhaust gas which is advantageous for reactivation of the underfloor catalyst. If the converter close to the engine contains a three-way catalyst, it likewise acts as oxidation catalyst in lean-burn operation and increases the nitrogen dioxide concentration. However, even in the case of stoichiometric operation, reactivation of the under-floor catalyst is in this case still possible since the catalyst close to the engine usually has a small volume and can therefore convert only a part of the nitrogen oxides and thus remove them from the reactivation, particularly at a high nitrogen oxide concentration in the exhaust gas.

Apart from carrying out the method of reactivating nitrogen oxide storage catalysts directly on the vehicle, the reactivation can also be carried out by removal of the catalyst from the vehicle in the course of a routine service and regeneration in a dedicated reactivation apparatus. In this apparatus, the catalyst can be treated with a gas mixture optimized for the reactivation. This gas mixture preferably comprises from 1 to 35% by volume of nitrogen oxides, from 5 to 50% by volume of oxygen, from 5 to 30% by volume of water vapor, from 0 to 20% by volume of carbon dioxide and, if appropriate, nitrogen as balance. The reactivation is in this case likewise carried out at a temperature of from 300 to 500° C. for a time of from 0.1 to 5 hours.

The invention is illustrated below with the aid of a few examples and figures. The figures show:

FIG. 1: Content of barium cerate in a $Pt/Ba/CeO_2$ storage catalyst as a function of temperature and duration of the thermal treatment. Quantification was effected by powder-diffractometric phase analysis and evaluation of the reflections at $2\Theta=40.9°$ and $2\Theta=41.1°$.

Figure 2:
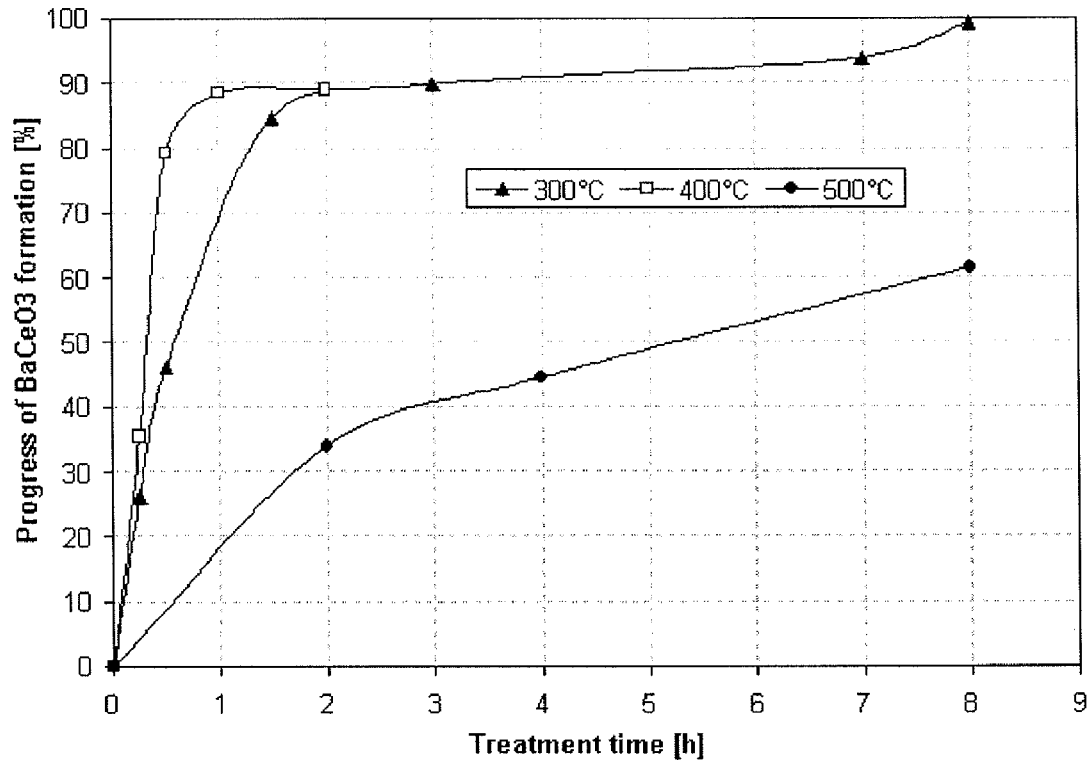

FIG. 2: Decomposition of barium cerate by treatment with water in the presence of nitrogen dioxide at various temperatures as a function of the treatment time; calculated from XRD measurements.

Figure 3:
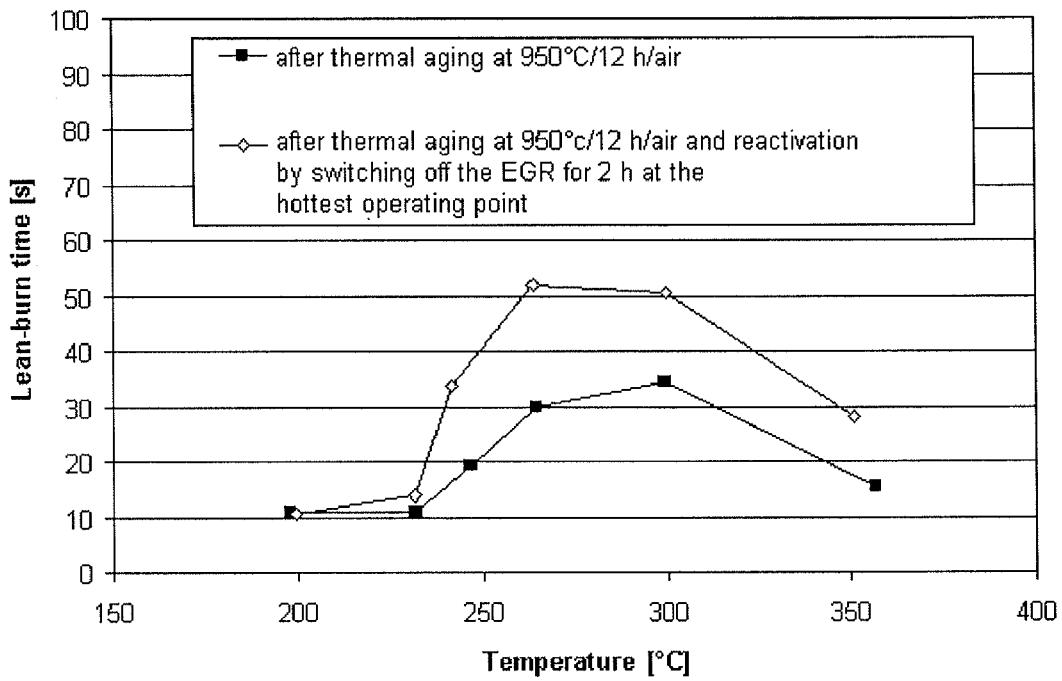

FIG. 3: Reactivation of a thermally damaged storage catalyst (system I of Example 3) in the underfloor region of a vehicle.

Figure 4:
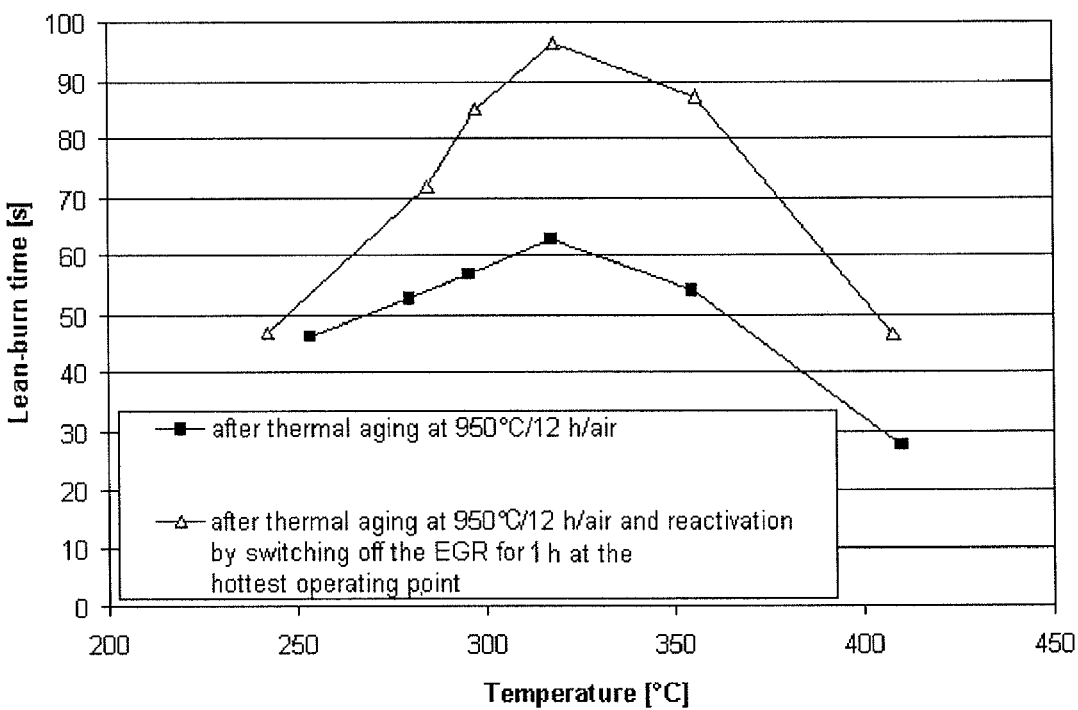

FIG. 4: Reactivation of a catalyst system from a storage catalyst close to the engine and a second storage catalyst located in the underfloor region of the vehicle (system II of Example 3).

Figure 5:
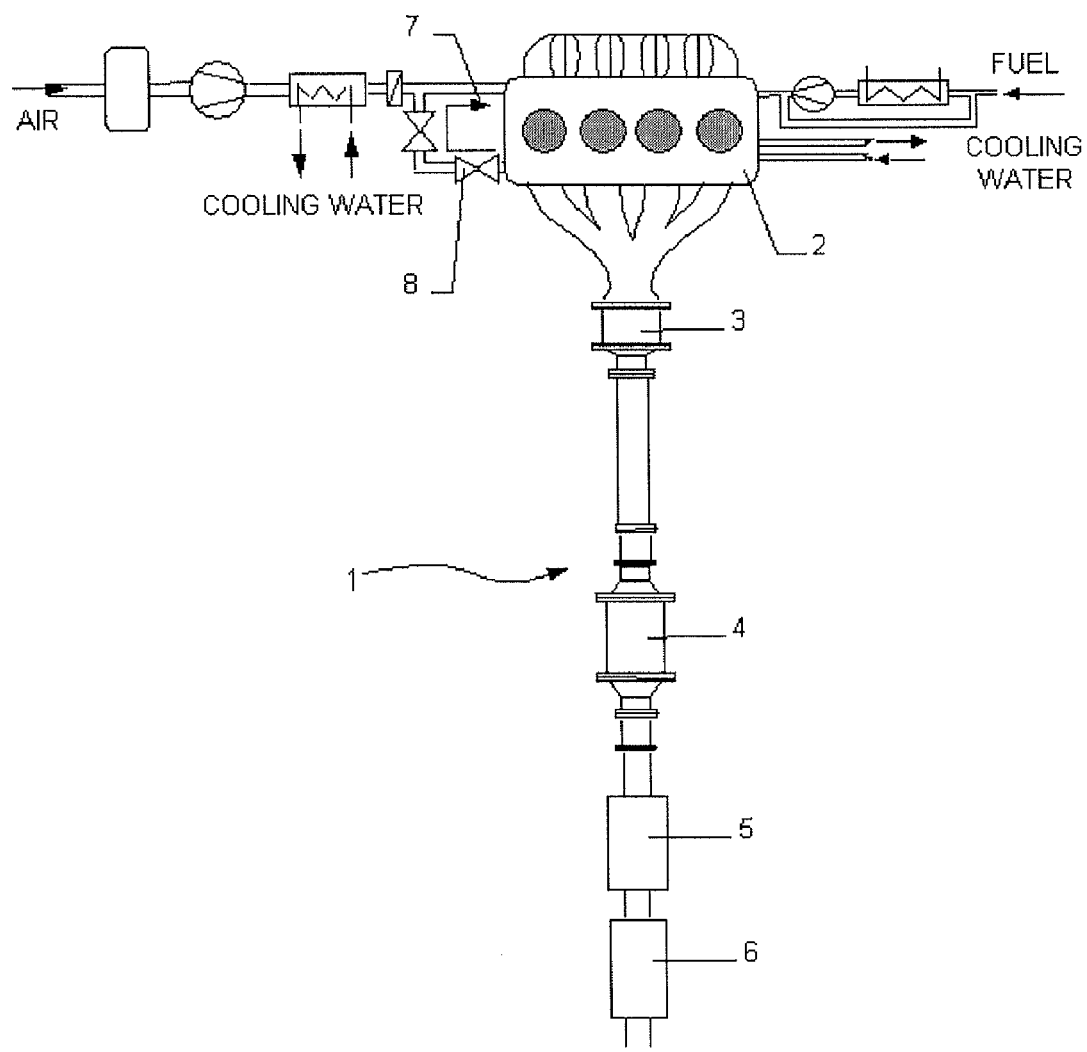

FIG. 5: Internal combustion engine having an exhaust gas purification unit which comprises an exhaust gas purification converter close to the engine and a second exhaust gas purification converter located in the underfloor region of the vehicle.

EXAMPLE 1

To examine the formation of barium cerate in a $Pt/Ba/CeO_2$ storage catalyst, cerium oxide having a specific BET surface area of 95 m²/g was impregnated firstly with an aqueous barium acetate solution and then with an aqueous solution of dinitrodiammine-platinum. After each impregnation step, the powder was dried overnight at 80° C. and then calcined at 500° C. for 5 hours.

To examine the formation of barium cerate, the powder samples obtained in this way were calcined at temperatures of 800, 850, 900, 950 and 1000° C. in a preheated furnace for various times ranging from 2 to 10 hours. After the thermal treatments, the barium cerate content of the samples was determined by X-ray diffraction. For this purpose, the samples were subjected to phase analysis in a Siemens D5000 X-ray powder diffractometer using Cu $K_\alpha$ radiation. The diffraction angle range $2\Theta$ examined was from 15 to 65° with a step width of 0.01° and a counting time of 2 s per step. In the diffraction patterns obtained, the peak areas of the reflections characteristic for $BaCeO_3$ at $2\Theta=40.9°$ and $2\Theta=41.1°$ were evaluated quantitatively. Standardization of the intensities was effected by matching with a copper reference by means of the intensity of the Cu(111) reflection at $2\Theta=43.17°$.

The results of these measurements are shown in FIG. 1. The formation of barium cerate can be detected even after calcination for one hour at a temperature of 800° C. After a thermal treatment at 850° C. for 8 hours, more than half of the material has been converted into barium cerate. Quantitative conversion can be observed after calcination at 900° C. for nine hours.

EXAMPLE 2

To examine the decomposition of barium cerate on treatment with a gas mixture comprising water vapor and nitrogen dioxide, barium cerate was firstly formed by calcining Pt/Ba/$CeO_2$ storage catalysts, whose production is described in Example 1, at 1000° C. for 10 hours.

The powder obtained was then exposed to a continuous gas stream composed of a 1:1 mixture of 1% by volume of $NO_2$ in synthetic air and about 3% by volume of $H_2O$ in helium (saturated at room temperature) in a fixed-bed reactor. The treatment was carried out at various temperatures, with 300° C. being selected as initial temperature since this temperature corresponds approximately to the temperature at which a storage catalyst achieves its optimum activity. Before the reaction gas mixture described has passed through the fixed bed of catalyst, the reactor was firstly heated to the target temperature for 30 minutes under helium. The reaction under reaction gas was then carried out for various times ranging from 15 minutes to 8 hours, and the fixed bed was then cooled to room temperature under helium.

The powder samples obtained in this way were characterized by X-ray powder diffractometry using the method described in Example 1 and the progress of the decomposition of barium cerate was established. The results are shown in FIG. 2. The measurements show that barium cerate can be decomposed relatively easily at a temperature of 300° C. in an atmosphere comprising nitrogen dioxide and water vapor. After a reaction time of 7 hours, virtually all of the barium cerate has been converted into barium nitrate.

Decomposition of barium cerate in an atmosphere composed of only helium saturated with water vapor is likewise observed at 300° C., but proceeds more slowly than in the presence of nitrogen dioxide. However, in this case, too, appreciable proportions of the barium cerate are reacted. According to the scheme indicated in reaction equation (2), the hydrolysis equilibrium of barium cerate is shifted to the product side by the presence nitrogen dioxide, since barium oxide formed as an intermediate can react very rapidly with $NO_2$ to form barium nitrate which is stable under these conditions.

The activity window of nitrogen oxide storage catalysts (NOx window) for the conversion of nitrogen dioxide into nitrogen displays maximum conversion rates in the temperature range from 250 to 400° C. The studies on the decomposition of barium cerate were therefore also carried out at temperatures of 400 and 500° C. The decomposition at 400° C. is more rapid than at 300° C. However, the decomposition rate decreases significantly at 500° C. An explanation for this is the fact that barium nitrate is unstable at higher temperatures and can therefore not be formed. Its decomposition commences at about 400° C. under nonisothermal conditions. The reaction of barium cerate with water is therefore influenced to a lesser extent by the presence of nitrogen dioxide at 500° C. than at lower temperatures.

EXAMPLE 3

Examples 1 and 2 show that nitrogen oxide storage catalysts which have been damaged in terms of their activity by thermal stress can be at least partly reactivated by treatment in a suitable gas mixture. It would be particularly advantageous if the exhaust gas of the engine, which likewise comprises nitrogen dioxide, water and carbon dioxide, could be used for this purpose.

To check this possibility, an engine test bed with a lean-burn engine (4 cylinder/compressor engine, 1.8 l capacity, maximum power: 125 kW at 5500 rpm, torque: 236 Nm at 4000 rpm) whose exhaust gas purification unit was equipped with two converter housings of which one was located in a position close to the engine and the other was located in the underfloor region of the vehicle was available.

The construction of this exhaust gas purification unit is shown in FIG. 5. Reference numeral (1) denotes the exhaust gas purification unit of the engine (2). The exhaust gas purification unit comprises the exhaust gas purification converter (3) close to the engine and an exhaust gas purification converter (4) in the underfloor region. The reference numerals (5) and (6) denote a preliminary muffler and a main muffler. The engine (2) is equipped with an air supply and a fuel supply and has an exhaust gas recirculation facility (7) which can be switched on or off by means of the valve (8).

Two different catalyst systems were examined:

| Catalyst | System I | System II |
|---|---|---|
| Close to the engine | Uncoated catalyst body | Catalyst as described in EP 1317953 A1 |
| Underfloor | Catalyst as described in EP 1317953 A1 | Catalyst as described in EP 1317953 A1 |

The catalysts according to EP 1317953 A1 which are used here contain, corresponding to claim 10 in said application, a storage material which comprises a basic barium compound as storage component applied to a high-surface-area support material based on cerium oxide.

In the converter close to the engine, a catalyst having a diameter of 11.84 cm and a length of 7.62 cm, corresponding to a catalyst volume of 0.84 l, was used. In the under-floor region, two catalysts having a total volume of 2 l, with each catalyst having a volume of 1 l, were used. The exhaust gas system I was equipped only with a nitrogen oxide storage catalyst in the underfloor region. To simulate the pressure drop, an un-coated catalyst body was used in the converter housing close to the engine. The exhaust gas system II was provided with nitrogen oxide storage catalysts in both converter housings.

The catalytic coating of all catalysts used in these studies corresponded to a catalyst formulation from EP 1317953 A1, which is hereby incorporated by reference with regard to the details of the formulation. The storage material of this catalyst is barium oxide on a mixed cerium/zirconium oxide (90% by weight of cerium oxide and 10% by weight of zirconium oxide).

Before installation in the converter housings, the catalysts were calcined at 950° C. in a furnace for 12 hours in order to bring about specific thermal aging of the catalysts.

The thermally aged catalyst systems were then characterized in the described configuration on the engine test bed by determining their lean-burn behavior as a function of the temperature upstream of the underfloor catalyst. To carry out the characterization, the engine was operated at various loadings in shift operation, so that, depending on the installation of the converter close to the engine, temperatures of from 200 to 360° C. (system I) or from 250 to 450° C. upstream of the underfloor catalyst resulted. The nitrogen oxide emission was determined by means of an NOx sensor located downstream of the underfloor catalyst. When a critical nitrogen oxide concentration threshold down-stream of the underfloor catalyst was reached, the lean-burn phase was stopped and the nitrogen oxide regeneration was commenced by switching over to rich-burn operating conditions. The end of the regeneration phase was likewise detected by means of the NOx sensor when this indicated breakthrough of the regeneration agent. The lean-burn operating times determined in this procedure were plotted as a function of the temperature upstream of the underfloor catalyst to characterize the nitrogen oxide storage behavior ("NOx window").

After characterization of the lean-burn behavior of the systems in the thermally aged state, reactivation of the respective catalyst system was carried out by switching off the exhaust gas recirculation for a particular time at the hottest operating point selected in the "NOx window". A reactivation time of two hours was selected for system I, and a reactivation time of one hour was selected for system II. After the end of the reactivation, the exhaust gas recirculation was switched on again and the characterization of the lean-burn behavior by means of the routine described above was repeated.

The results for system I are shown in FIG. 3, with the curve having the measurement points denoted by the filled-in squares representing the "NOx window" in the thermally aged state and the curve having the open diamonds showing the "NOx window" after reactivation.

FIG. 4 shows the results obtained for system II, with the curve having the measurement points denoted by the filled-in squares likewise denoting the "NOx window" in the thermally aged state and the curve having the open triangles showing the "NOx window" after reactivation.

In both experiments, it was able to be shown that an increase in the nitrogen oxide concentration in the exhaust gas of a lean-burn engine, which is brought about by switching off the exhaust gas recirculation, leads to a partial restoration of the activity of thermally aged nitrogen oxide storage catalysts if the nitrogen oxide storage catalysts comprise a basic barium compound on a support material based on cerium oxide as nitrogen oxide storage material.

The invention claimed is:

1. A method of reactivating a thermally aged nitrogen oxide storage catalyst comprising basic strontium or barium compounds or strontium and barium compounds on a support material comprising cerium oxide and additionally containing strontium and/or barium compounds with the support material formed as a result of thermal aging, said method comprising decomposing the compounds of strontium and/or barium with the support material by treatment with a gas mixture comprising from 0.05 to 5% by volume of nitrogen dioxide, from 5 to 20% by volume of oxygen, from 5 to 15% by volume of water vapor, from 0 to 20% by volume of carbon dioxide and essentially nitrogen as balance and the treatment is carried out for from 0.5 to 5 hours at temperatures in the range from 300 to 500° C.

2. The method as claimed in claim 1, wherein the nitrogen oxide storage catalyst is part of an exhaust gas purification unit on a vehicle having a lean-burn engine and exhaust gas recirculation and the gas mixture used for reactivation is formed by the exhaust gas of the internal combustion engine and the reactivation is carried out at an operating point of the lean-burn engine at which the exhaust gas temperatures are from 300 to 500° C.

3. The method as claimed in claim 2, wherein nitrogen oxide concentration in the exhaust gas is increased by switching off the exhaust gas recirculation and/or altering the timing of the ignition of the engine so as to increase the combustion temperature in cylinders of the engine.

4. The method as claimed in claim, 3 wherein exhaust gas purification unit comprises a catalytic converter close to the engine and an underfloor converter.

5. The method as claimed in claim 4, wherein both converters contain a nitrogen oxide storage catalyst.

6. The method as claimed in claim 4, wherein the converter close to the engine contains a diesel oxidation catalyst or a three-way catalyst and the underfloor converter contains a nitrogen oxide storage catalyst.

7. The method as claimed in claim 1, wherein the nitrogen oxide storage catalyst is part of an exhaust gas purification unit on a vehicle having a lean-burn engine and the catalyst is, for the purpose of reactivation, removed from the exhaust gas purification unit during a scheduled service and is treated with the gas mixture for 0.1 to 5 hours.

8. A method of reactivating a thermally aged nitrogen oxide storage catalyst comprising basic strontium or barium compounds or strontium and barium compounds on a support material comprising cerium oxide and additionally containing strontium and/or barium compounds with the support material formed as a result of thermal aging, said method comprising decomposing the compounds of strontium and/or barium with the support material by treatment with a gas mixture comprising from 1 to 35% by volume of nitrogen oxides, from 5 to 50% by volume of oxygen, from 5 to 30% by volume of water vapor, from 0 to 20% by volume of carbon monoxide and, if appropriate, nitrogen as balance.

* * * * *